US010189694B2

(12) United States Patent
Blomme et al.

(10) Patent No.: US 10,189,694 B2
(45) Date of Patent: Jan. 29, 2019

(54) YEAST-CREAM-DOSING DEVICE AND METHOD

(75) Inventors: Karel Alfons Frans Blomme, Evergem (BE); Peter Rene Anna Smet, Sint-Niklaas (BE)

(73) Assignee: LESAFFRE ET CIE, Paris (FR)

( * ) Notice: Subject to any disclaimer, the term of this patent is extended or adjusted under 35 U.S.C. 154(b) by 2054 days.

(21) Appl. No.: 10/535,844

(22) PCT Filed: Nov. 21, 2003

(86) PCT No.: PCT/EP03/13086

§ 371 (c)(1), (2), (4) Date: Jan. 10, 2006

(87) PCT Pub. No.: WO2004/048253

PCT Pub. Date: Jun. 10, 2004

(65) Prior Publication Data

US 2006/0110512 A1 May 25, 2006

(30) Foreign Application Priority Data

Nov. 22, 2002 (EP) .................................... 02026074
Aug. 12, 2003 (EP) .................................... 03018279

(51) Int. Cl.

| | |
|---|---|
| ***A23C 3/00*** | (2006.01) |
| ***B67D 1/12*** | (2006.01) |
| ***B67D 3/00*** | (2006.01) |
| ***B67D 3/04*** | (2006.01) |
| *B67D 1/08* | (2006.01) |

(52) U.S. Cl.

CPC ......... *B67D 1/1227* (2013.01); *B67D 3/0009* (2013.01); *B67D 3/0029* (2013.01); *B67D 3/0083* (2013.01); *B67D 3/041* (2013.01); *B67D 2001/0827* (2013.01)

(58) Field of Classification Search

CPC .... B67D 1/1227; B67D 3/041; B67D 3/0009; B67D 3/0029; B67D 2001/0827

USPC .......... 222/185.1, 105, 146.6, 529; 426/523; 141/83

See application file for complete search history.

(56) References Cited

U.S. PATENT DOCUMENTS 135,617 A * 2/1873 Andrews ....................... 222/130
1,994,496 A * 3/1935 Warncke .................... 426/330.2
(Continued)

FOREIGN PATENT DOCUMENTS

DE 33 32 236 A 3/1985
EP 0599776 * 6/1994 ............ B65D 81/18
(Continued)

OTHER PUBLICATIONS

Abstract of DE 30502455, published Oct. 9, 1986.
Abstract of JP 06-18171, published Jul. 5, 1994.
Abstract of JP 06-270968, published Sep. 27, 1994.

*Primary Examiner* — Donnell Long
(74) *Attorney, Agent, or Firm* — Sughrue Mion, PLLC

(57) ABSTRACT

The invention relates to a yeast cream-dosing device and method. According to the invention, the yeast cream is disposed in an interchangeable transport container (20) which is located inside a refrigerating compartment (10), the aforementioned container being connected to an extraction opening (27) by means of an outlet conduit (26) which can be opened and closed by an opening/closing mechanism (30).

38 Claims, 3 Drawing Sheets

(56) References Cited

U.S. PATENT DOCUMENTS

| | | | | | |
|---|---|---|---|---|---|
| 2,147,271 | A | * | 2/1939 | Schwarz et al. | 435/296.1 |
| 2,839,262 | A | | 6/1958 | Hellyer | |
| 3,117,695 | A | * | 1/1964 | Cox, Jr. | 222/105 |
| 3,138,293 | A | * | 6/1964 | Roak et al. | 222/105 |
| 3,178,064 | A | * | 4/1965 | Layne | 222/105 |
| 3,238,978 | A | * | 3/1966 | De Frenne | 141/1 |
| 3,268,412 | A | * | 8/1966 | Champagnat et al. | 435/248 |
| 4,450,987 | A | * | 5/1984 | Boettcher et al. | 222/641 |
| 4,784,297 | A | * | 11/1988 | Katz | 222/161 |
| 4,890,772 | A | * | 1/1990 | Heuberger et al. | 222/156 |
| 4,997,108 | A | * | 3/1991 | Hata | 222/105 |
| 5,022,558 | A | * | 6/1991 | Faerber et al. | 222/105 |
| 5,156,297 | A | * | 10/1992 | Engler | 222/23 |
| 5,244,020 | A | * | 9/1993 | Bruno et al. | 141/83 |
| 5,464,120 | A | * | 11/1995 | Alpers et al. | 222/1 |
| 5,490,547 | A | * | 2/1996 | Abadi et al. | 141/359 |
| 6,213,174 | B1 | * | 4/2001 | Cook et al. | 141/83 |
| 6,220,312 | B1 | * | 4/2001 | Hirsch et al. | 141/83 |
| 6,756,069 | B2 | * | 6/2004 | Scoville et al. | 426/594 |

FOREIGN PATENT DOCUMENTS

| | | | | | |
|---|---|---|---|---|---|
| EP | 0 792 903 | A | | 9/1997 | |
| EP | 0792930 | A1 | * | 9/1997 | A21D 8/047 |
| FR | 1 384 258 | | | 12/1963 | |
| FR | 2 655 092 | A | | 5/1991 | |
| WO | WO 02 03807 | A | | 4/2002 | |
| WO | WO0230807 | | * | 4/2002 | B67D 3/00 |
| WO | WO 02 059035 | A | | 8/2002 | |

* cited by examiner

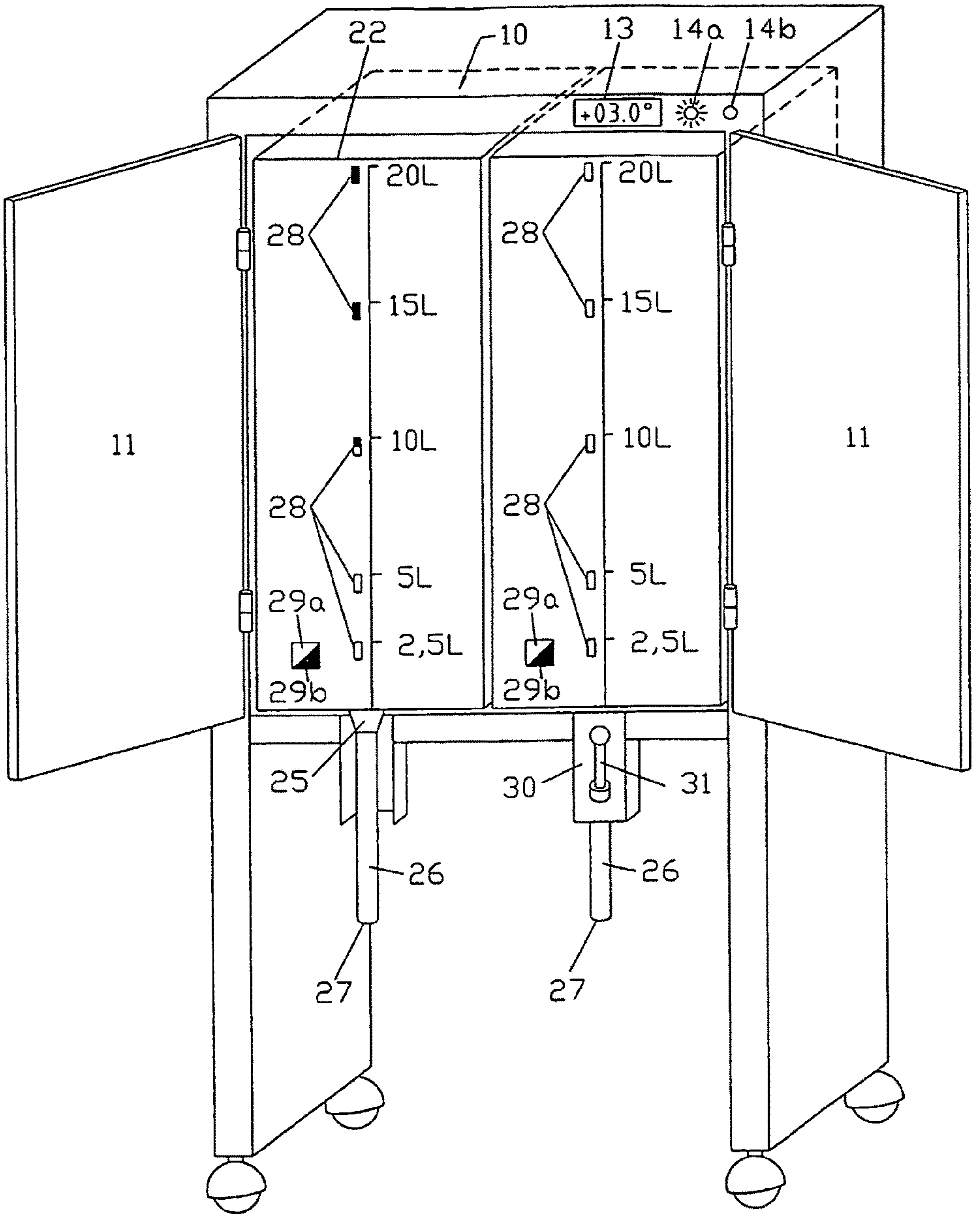
22
10
13
14a
14b
+03.0°
20L
15L
10L
5L
2,5L
28
28
28
28
29a
29b
29a
29b
11
11
25
26
27
30
31
26
27

YEAST-CREAM-DOSING DEVICE AND METHOD

FIELD OF THE INVENTION

The present invention relates to a device and method for the dosing of stable bakers' yeast cream, in particular of stabilized yeast cream.

BACKGROUND TO THE INVENTION

It is known, in the bakery, to use bakers' yeast in the form of a bakers' yeast cream.

Bakers' yeast cream is understood as meaning a liquid suspension, typically an aqueous suspension, of live bakers' yeast cells, said suspension having a dry matter content of at least 12% by mass and generally of between 12 and 50% by mass (broad definition of yeast cream). The bakers' yeast cream preferably meets the normal definition of yeast cream, i.e. it has a dry matter content of between 12 and 25% by mass, and more preferably of between 15 and 22% by mass. However, the present invention is also useful for bakers' yeast creams with a high dry matter content, that is to say of at least 25% by mass, such as, in particular, the high-density bakers' yeast creams containing one or more osmotic agents, for example food salts and polyhydroxy compounds. High-density bakers' yeast creams of this kind, which may in particular have a dry matter content of 25 to 48% by mass, or of 25 to 46% by mass, are known and are described, for example, in WO 91/12315 and WO 03/048342.

It is known in particular in the bakery to use baker's yeast creams.

A stable yeast cream is a yeast cream retaining its homogeneity for a sufficiently long time so that it may be conserved without stirring, during its storage and possibly its transport, until it is used in the preparation of a dough for baking.

A stabilized bakers' yeast cream is a bakers' yeast cream containing one or more food stabilizers which delay or prevent decantation of the yeast cells of the suspension. Due to the presence of said food stabilizer or stabilizers in the suspension, the yeast cream retains its homogeneity longer when it is conserved without stirring. Among the various food stabilizers that can be used to stabilize yeast cream, can be mentioned gums, such as xanthan gum, and thermally and/or chemically modified starches, such as acetylated distarch adipate corresponding to the definition of modified starch E1422. Such stabilized yeast creams are described, for example, in EP-A-0 792 930.

The stable yeast cream is preferably a stabilized yeast cream.

The homogeneity of the yeast cream, that is to say the substantial absence of a concentration gradient of dry matter in the cream, is an important property for the baker.

Indeed, the main advantage for the baker in using a bakers' yeast cream is that it permits simple dosing by virtue of its liquid form. However, this dosing of the yeast can be precise and reliable only if the yeast cream is homogeneous. Lack of homogeneity, or, in other words, the presence of a perceptible concentration gradient of dry matter in the bakers' yeast cream, leads to errors in the quantity of yeast cells measured out in successive cream-dosing operations for introduction of said bakers' yeast cream into doughs, and thus leads to variations in the quality of the baked products prepared with these doughs.

The stable or stabilized bakers' yeast cream can also comprise one or more other ingredients, such as bread improvers (oxidizing agents, reducing agents, enzyme preparations, emulsifiers) and/or preserving agents and/or other technological auxiliaries such as polyols.

An installation for dosing of stabilized bakers' yeast cream has been proposed in EP-A-0 792 930. Such an installation is useful in particular for industrial bakeries with a yeast cream consumption of at least 300 liters per week, typically of at least 500 liters per week.

An installation of this type for dosing bakers' yeast cream is generally not suitable for bakeries in which the consumption of yeast cream does not exceed 150 liters per week. Indeed the costs associated with the installation, use and maintenance of this installation for dosing yeast cream, make using such an installation unprofitable for a small-scale bakery.

It has also been proposed to supply stabilized yeast cream in small packages, for example of 0.1 liter or more.

Although such packages may prove useful for domestic use, they are not at all practical for the baker who regularly and almost continuously requires relatively small quantities of yeast cream.

Since stable or stabilized bakers' yeast cream is a highly perishable food product, it must be kept cool.

The temperature in a baker's workshop, where the doughs are prepared, generally rises to at least 15° C. Such a temperature does not permit adequate conservation of the stable or stabilized yeast cream, because it leads to an acceleration in the loss of viability and fermentative power of the yeast and in the growth of microbial contaminants which may be present. The baker therefore has to store the yeast cream in a refrigerator and take it out of the refrigerator when introducing the yeast cream into the kneader for the preparation of a dough.

Different options may be envisaged for the type of the small packages mentioned above.

According to a first option, the stable or stabilized yeast cream is packaged in quantities corresponding to the amount of yeast cream needed to prepare a single batch of dough. This option, which may be convenient for domestic use, is not convenient for bakers because it leads to a higher price for the cream and deprives bakers of any flexibility in their productions, which are generally multiple.

According to another option, the yeast cream is packaged in quantities corresponding to the amount of yeast cream needed to prepare a series of batches of dough.

The baker then has to either leave his workshop on each occasion and go into his refrigerator in order to measure out the desired amount of yeast cream or, has to remove the package of yeast cream from his refrigerator, measure out the desired amount of yeast cream and immediately return the package of yeast cream to the refrigerator. These operations are in general rather impractical and inefficient for the professional.

In the case of packaging in quantities corresponding to the amount of yeast cream needed to prepare a series of batches of dough, the baker will naturally tend to remove the package of stable or stabilized yeast cream from his refrigerator and leave it longer than is strictly necessary in his workshop and, consequently, at temperatures leading to accelerated perishing of the yeast cream contained therein, with all the ensuing problems of poor quality of the baked products and of additional costs due to the quantity of yeast cream to be discarded.

SUMMARY OF THE INVENTION

The present invention provides in particular an elegant solution to these problems and makes it possible for a baker, who for example uses between 3 and 300 liters of yeast cream per week, to use stable or stabilized yeast cream under the best possible conditions.

The present invention relates in particular to a device for dosing of stable or stabilized bakers' yeast cream in the bakery. Said device comprises a piece of furniture equipped with a refrigerated compartment or chamber. The internal temperature of this refrigerated compartment is from −2° C. to 12° C., preferably from 0 to 10° C., and even more preferably from 0 to 5° C. The device also comprises an interchangeable transport reservoir containing the stable or stabilized yeast cream. This interchangeable transport reservoir has a total internal volume of between 1 and 100 liters, preferably between 3 and 100 liters, more preferably between 5 and 50 liters, and even more preferably between 10 and 25 liters. The interchangeable transport reservoir is located in the refrigerated compartment and has an outlet opening for the yeast cream.

The device also comprises an outlet conduit for the dosing of yeast cream. Said conduit connects the outlet opening of the interchangeable transport reservoir to a dispensing opening located outside the refrigerated chamber.

The device also comprises an opening/closing mechanism for said outlet conduit. This opening/closing mechanism makes it possible, on the one hand, to open the outlet conduit for dispensing the yeast cream and makes it possible, on the other hand, to close the outlet conduit in order to stop the dispensing of the yeast cream.

The device according to the invention for dosing of yeast cream permits dispensing of a dosed quantity of yeast cream from the interchangeable transport reservoir via the dispensing opening, by activation of the opening/closing mechanism.

The device according to the invention thus allows a baker, who for example uses between 3 and 300 liters of yeast cream per week, to use yeast cream under the best possible conditions. Indeed the yeast cream is kept cool, and the baker has access to the yeast cream without having to fetch it from inside his refrigerator. Moreover, the invention makes it possible to maintain the quality of the yeast cream for a maximum period of conservation, because the yeast cream is kept at a controlled conservation temperature until it is dispensed.

The invention also has the advantage of enabling dosage devices of fairly small dimensions, and of enabling dosage devices which have a simple design and are easy to use. It will be noted, for example, that the device according to the invention does not require the presence of a pump for dispensing the yeast cream from the reservoir.

If, however, the device does comprise a pump for the yeast cream, it is preferably a peristaltic pump.

The piece of furniture of the device according to the invention is advantageously equipped with transport means, such as casters. This makes it easier in particular to move the device about in the bakery.

A transport reservoir is a receptacle permitting transport of a stable or stabilized yeast cream under hygienic conditions, for example during transport of the yeast cream from the supplier to the baker. The transport reservoir may take various embodiments. One can, for example, mention rigid (self-supporting) containers or cans and bags of greater or lesser flexibility, including collapsible bags in particular. The bags of greater or lesser flexibility are themselves preferably contained in another rigid (self-supporting) packaging such as a carton. A self-supporting packaging or outer packaging is preferably a packaging or outer packaging which, when filled, can be stacked several layers high without deforming. In the case of flexible bags with an outer packaging of self-supporting cardboard, the rigidity of the assembly is provided chiefly by the outer packaging or packagings.

The transport reservoir, whether rigid or flexible, is made of suitable materials for transport of food products such as yeast cream.

Suitable materials of this kind are defined by the relevant regulations on materials coming into contact with food products. These materials are, for example, polyethylene (PE), high-density polyethylene (HDPE), low-density polyethylene (LDPE), linear low-density polyethylene (LDPE), polycarbonate, polyester, polyethylene terephthalate (PET), polytetrafluoroethylene (PTFE), polypropylene (PP) and polyamide (PA).

The walls of the transport reservoir can be made of single-layer materials or multi-layer materials such as laminated or stratified materials, comprising for example a metal layer, such as an aluminum layer, and corrugated or non-corrugated cardboard lined with plastic.

The transport reservoir preferably allows the baker to visually determine or estimate the quantity of yeast cream present in the reservoir, especially due to the fact that the reservoir is transparent or translucent or comprises one or more transparent or translucent parts.

The total internal volume of the interchangeable transport reservoir corresponds to the maximum volumetric content that said reservoir can contain. Thus, in the case of a rigid (self-supporting) transport reservoir, the total internal volume simply corresponds to the internal volume of said reservoir. In the case of a flexible bag and in particular a collapsible bag, the total internal volume of the reservoir is the volume of the bag in the inflated state.

According to the present invention, the transport reservoir is an interchangeable reservoir. The transport reservoir can thus be mounted in the refrigerated compartment and can subsequently be dismounted from the refrigerated compartment, for example after all of the stable or stabilized yeast cream initially present in the reservoir has been measured out, or after a given storage time of the stable or stabilized yeast cream, in order to replace it with fresh stable or stabilized yeast cream.

The present invention has the advantage of not requiring mechanical means for maintaining the homogeneity of the yeast cream present in the interchangeable transport reservoir. The device according to the invention in particular does not require the presence of a stirrer inside the transport reservoir. Similarly, the device according to the invention does not require the presence of a horizontal rotation axis for the transport reservoir containing the stable or stabilized yeast cream.

The outlet opening of the interchangeable transport reservoir is typically located at the bottom of the refrigerated compartment.

Advantageously, said outlet opening is located at the bottom of the refrigerated compartment, and the outlet conduit is preferably such that the yeast cream present in the interchangeable transport reservoir can be dispensed by gravity via the outlet conduit and the dispensing opening.

The outlet conduit of the device according to the invention can also be such that the yeast cream present in the interchangeable transport reservoir can be siphoned via the outlet conduit towards the dispensing opening.

The outlet conduit can consist of a single piece or can be made up of several cooperating elements.

According to one embodiment of interest, especially from the point of view of hygiene, the outlet conduit is a tube with open ends.

According to another embodiment, the outlet conduit, for example in the form of a tube with open ends, forms an integral part of the interchangeable transport reservoir.

According to another embodiment, the outlet conduit, for example in the form of a tube with open ends, is a separate part which is mounted on the interchangeable transport reservoir.

The outlet conduit, for example in the form of a tube with open ends, advantageously comprises a flexible part. The reason is that, in this case, the outlet conduit can be closed simply by pinching said flexible part, and can be opened simply by releasing said flexible part.

Thus, according to an advantageous embodiment, the opening/closing mechanism of the device according to the invention is designed in such a way as to enable closure of the outlet conduit by pinching the flexible part, and to enable its opening by releasing said flexible part.

The device according to the invention can comprise a weighing apparatus provided with a support surface for a receptacle. Such a weighing apparatus makes it possible to weigh the quantity of the yeast cream introduced into the receptacle during the dispensing of the yeast cream.

According to a sophisticated embodiment, the device according to the invention is provided with a control station activating the opening and closure of the outlet conduit by the opening/closing mechanism.

For example, the device according to the invention can comprise a weighing apparatus, such as described above, and a control station activating the opening and closure of the outlet conduit by the opening/closing mechanism, whereby said control station activates the closure of the outlet conduit once a desired quantity of yeast cream is present in the receptacle.

The opening/closing mechanism can also be activated manually or by the presence or absence of a receptacle below the dispensing opening.

The opening/closing mechanism can, for example, be activated by means of a lever which is moved by hand, or by the receptacle destined to contain the quantity of stable or stabilized yeast cream necessary for producing a batch of dough to be kneaded.

The device can also be provided with a system detecting the presence or absence of a receptacle below the dispensing opening, whereby its control station activates the opening/closing mechanism as a function of the detection of the presence or absence of a receptacle below the dispensing opening. Such a detection system can, for example, be an optical system.

The device is advantageously provided with a system activating the closure of the outlet conduit by the opening/closing mechanism after detection of a flow of yeast cream not collected by a receptacle.

As already mentioned above, the interchangeable transport reservoir can be a rigid (self-supporting) container or can having, according to the invention, a total internal volume of between 1 and 100 liters, preferably between 3 and 100 liters, more preferably between 5 and 50 liters, and even more preferably between 10 and 25 liters, or a flexible bag, in particular a collapsible bag, having such a total internal volume, that is to say an internal volume in the inflated state of between 1 and 100 liters, preferably between 3 and 100 liters, more preferably between 5 and 50 liters, and even more preferably between 10 and 25 liters. The collapsible bag can usefully be a polyethylene bag having a wall thickness of 10 to 200 μm, preferably 10 to 100 μm, for example 25 or 30 to 50 μm.

The preferred solution is a flexible standard polyethylene bag, that is to say made of linear or non-linear low-density polyethylene.

The embodiment of the device according to the invention in which the device comprises a collapsible bag of this kind is particularly advantageous since it permits the dispensing of a dosed quantity of yeast cream from the collapsible bag via the dispensing opening by activation of the opening/closing mechanism without entry of gas from outside the collapsible bag into the collapsible bag.

The use of collapsible bags is known in particular for transport and storage of drinks, such as wine, and in drips used in medicine. The essential characteristic of the collapsible bags is that they are flexible enough to allow liquid present in the bag to flow out without compensation of the volume of the lost liquid by intake of gas. Indeed the collapsible bags are characterized by the fact that they collapse and, consequently, their internal volume diminishes as the liquid flows out.

The use of a collapsible bag enables, in particular, storage of the yeast cream in the refrigerated compartment of the device without the yeast cream coming into contact with contaminants, such as microorganisms, present in the environment of the bakery.

It should be noted that it is also possible to avoid contamination of the yeast cream in the reservoir by contaminants present in the environment in cases where, during the dispensing of the yeast cream, gas enters into the reservoir to compensate for the quantity of yeast cream dispensed, for example in the case of a rigid (self-supporting) container or can.

For example, the opening or conduit through which the gas enters the reservoir can be provided with a filter preventing the entry of such contaminants.

According to an advantageous embodiment of the invention, the collapsible bag is located in a supporting wire basket or a rigid (self-supporting) casing. This type of collapsible bag inside a casing or a basket is commercially known as a "bag-in-box". An example of such a "bag-in-box" is described in U.S. Pat. No. 6,223,981.

According to another embodiment, the collapsible bag is suspended in the refrigerated compartment. In this case, the refrigerated compartment is provided with suspension means for the bag. The collapsible bag is advantageously provided with means facilitating its suspension, for example one or more eyelets, said eyelet or eyelets being advantageously reinforced.

In order to promote the flow of the yeast cream from the collapsible bag, the device can be provided with a means for applying pressure to the outside of the collapsible bag present in the refrigerated compartment. For example, the device can be provided with a means by which it is possible to increase the pressure in the refrigerated compartment. Mechanical means may also be envisaged for applying pressure to the collapsible bag.

The presence of a pressure means is particularly useful in the case of very viscous yeast creams and/or when the collapsible bag is almost empty.

Such pressure means are in particular known from DE-A-3 502 455.

It is obvious that the refrigerated chamber and/or the collapsible bag can also be provided with other means promoting easier and/or more complete emptying or drainage of the collapsible bag. Such means are described in particular in DE-A-3 502 455, WO 89/00535, WO 85/04383, WO 90/06888, WO 01/79072 and EP-A-0 138 620.

An important preferred property of the transport reservoirs is their drop resistance. Indeed it is desirable for transport reservoirs, in particular for liquids, to remain leaktight upon impact, in view of the fact that, during transport of industrial products, occasional falls are almost inevitable. Drop tests have been developed to check the drop resistance of the transport reservoirs.

For the present case, the transport reservoir according to the invention preferably withstands free drops from a height of 110 cm. In other words, the transport reservoir containing stable yeast cream advantageously remains leaktight when it is subjected to a single free drop from a height of 110 cm, even if the impact between the reservoir and the ground takes place obliquely, in particular on the upper or lower edge of the transport reservoir.

Several means exist for improving the drop resistance of the transport reservoirs according to the invention. It will be noted, for example, with regard to the flexible or collapsible bags, that equipping them with a wire basket and/or supporting basket or with a rigid (self-supporting) casing already considerably contributes to the drop resistance of the reservoirs according to the invention. There exist such baskets and casings for flexible collapsible bags which have been specifically designed to have a high level of drop resistance and in particular to oblique falls. The contribution of the basket or of the casing to the drop resistance is particularly effective when the outer transverse contour of the bag is greater than the inner transverse contour of the basket or casing.

The flexible or collapsible bag, with or without basket or casing, can also be provided with a reinforcing layer or pouch, for example of polypropylene, polyester, polyethylene or polyamide, which surrounds the flexible or collapsible bag. This reinforcing layer or pouch can, for example, be a reinforcement netting or fabric, and it has the same reinforcing role as the wire basket.

In the field of food liquids, such as yeast creams, a preferred solution consists in using a flexible pouch made of standard polyethylene, a reinforcement pouch and a carton, the whole assembly being self-supporting, as defined above.

By using a device according to the invention of which the piece of furniture comprises at least two refrigerated compartments, each containing an interchangeable transport reservoir, or by using a device according to the invention of which the piece of furniture comprises one refrigerated compartment containing at least two interchangeable transport reservoirs, the baker is able to avoid inconvenient delays or interruptions in work when a first interchangeable transport reservoir of a device is empty or almost empty, by then switching this to a second interchangeable transport reservoir of the device for the purpose of dispensing yeast cream.

In this case, the device preferably comprises, for each of its interchangeable transport reservoirs, an outlet conduit connecting the outlet opening of said reservoir to a dispensing opening outside the refrigerated chamber in which the reservoir is located, and also an opening/closing mechanism enabling the opening and closure of this outlet conduit.

The piece of furniture of the device according to the invention can thus comprise at least two refrigerated compartments which contain an interchangeable transport reservoir containing stable or stabilized yeast cream, as described above.

The piece of furniture of the device according to the invention can also comprise one refrigerated compartment which contains at least two such interchangeable transport reservoirs containing stable or stabilized yeast cream.

In these cases, the device according to the invention advantageously comprises, for each of the interchangeable transport reservoirs:

- an outlet conduit for dosing of the yeast cream, said conduit connecting the outlet opening of the interchangeable transport reservoir to an dispensing opening outside the refrigerated chamber; and
- an opening/closing mechanism enabling the opening of said outlet conduit for dispensing the yeast cream, and permitting the closure of said outlet conduit in order to stop the dispensing of the yeast cream from said transport reservoir in question.

The baker is also able to avoid delays or inconvenient work interruptions by using an installation according to the invention comprising at least two devices according to the invention.

The invention also relates to transport reservoirs containing stable or stabilized yeast cream. Said reservoirs have a total internal volume of between 3 and 100 liters, preferably between 5 and 50 liters, and more preferably between 10 and 25 liters. The transport reservoir according to the invention is additionally provided with an outlet opening and with a hollow tube comprising a flexible part located outside the reservoir. The outlet opening terminates in the hollow tube or vice versa.

The hollow tube can be a tube open at both ends. To avoid leaking of yeast cream during the transport of the cream in the transport reservoir, the hollow tube can be closed in a leaktight manner, the closed end being removed or opened for the dispensing of dosed quantities of yeast cream from the transport reservoir.

It is known that, during its transport and storage, fresh yeast may release $CO_2$. The occurrence of this phenomenon and the quantity of $CO_2$ released depend in particular on the temperature of the fresh yeast.

To avoid excessive overpressures, it is also known to provide the fresh yeast transport and storage reservoirs with a vent.

Such reservoirs for the transport and storage of yeast which are provided with a vent are described in JP-A-062 709 681, JP-A-06 181 751, EP-A-0 599 776 and EP-A-0 792 930.

Similarly, the transport reservoir according to the invention is in general usefully provided with a means forming a vent. During its transport, the transport reservoir according to the invention provided with a means forming a vent is preferably oriented in such a way that the means forming a vent is located at least partially above the level of the yeast cream.

It should be noted that, in the device according to the invention, the presence of a vent on the transport reservoir is clearly less important or even, depending on the case, superfluous as the transport reservoir is located in the refrigerated compartment.

According to a specific embodiment, the means forming the vent of the transport reservoir according to the invention is located on the hollow tube, for example at the end of the hollow tube opposite the outlet opening of the transport reservoir.

During its transport, the transport reservoir according to this embodiment is typically oriented with the hollow tube, acting as a vent positioned above the level of the yeast cream. When introducing the interchangeable transport reservoir into the device according to the invention, the hollow tube can be converted into an outlet conduit by removing the vent located on this tube opposite the outlet opening.

Thus, the hollow tube can be converted into an outlet conduit enabling the dispensing of the yeast cream by gravity, by changing the orientation of the reservoir so that the outlet opening is located at the bottom of the refrigerated compartment and by removing the vent from the hollow tube.

Among possible vents, particular preference is given to vents permeable to $CO_2$ and leaktight to liquids.

Suitable vents and materials for their production are known in the prior art and are described, for example, in DE-A-2 509 258, U.S. Pat. No. 4,136,796, FR-A-2 259 026, EP-A-0 593 840 and EP-A-0 729 901.

According to an option totally compatible with each of the embodiments described above, the transport reservoir according to the invention is a collapsible bag.

Said collapsible bag is advantageously surrounded by one or more outer packagings. A first outer packaging can, for example, be a protective outer packaging made of a flexible resistant material providing mechanical resistance and, for example a netting or fabric made of said flexible resistant material. A second outer packaging can, for example, consist of a rigid casing, the whole assembly being self-supporting, as previously defined above.

The outer packaging made of flexible material and covering the flexible or collapsible bag, so reinforcing the mechanical resistance of said flexible or collapsible bag, is preferably welded at least partially to the contour of the flexible bag.

The transport reservoir according to the invention, placed in the refrigerated compartment according to the invention, is advantageously transparent or translucent or includes one or more transparent or translucent parts.

The present invention also relates to kits for producing transport reservoirs according to the invention.

Such a kit comprises a transport reservoir containing stable or stabilized yeast cream. Said reservoir has a total internal volume of between 3 and 100 liters, preferably between 5 and 50 liters, and more preferably between 10 and 25 liters.

The kit also comprises a hollow tube having a flexible part.

The transport reservoir and the hollow tube of the kit can be delivered together or separately to the baker.

Said transport reservoir and said hollow tube are provided with connection means enabling the hollow tube to be mounted on the transport reservoir so as to form a transport reservoir according to the invention.

The connection means of the transport reservoir and of the hollow tube can, for example, be designed so that an outlet opening is created in the transport reservoir, for example by puncturing said reservoir, when the tube is mounted on the reservoir.

The hollow tube of the kit can be a single-use hollow tube. In this case, the connection means are usefully configured so that the mounting of the hollow tube on the reservoir is irreversible.

The hollow tube of the kit can also be a reusable hollow tube which, having been mounted on a first reservoir of the kit, can be detached from said first reservoir and mounted on a second reservoir, preferably after cleaning.

The transport reservoir of the kit according to the invention can be a collapsible bag, said bag advantageously being surrounded by one or more outer packagings for mechanical protection, for example a flexible netting or fabric conferring mechanical resistance and/or a rigid (self-supporting) casing, preferably of cardboard, or a wire basket.

It is to be noted that in the above, in particular as regards the various embodiments of the device, of the reservoir, of the kit and of the use according to the invention, the term "yeast cream" or "bakers' yeast cream" concerns a liquid suspension, typically an aqueous suspension, of live bakers' yeast cells, this suspension having a dry matter content of at least 12% by mass and generally of between 12 and 50% by mass (broad definition), that the yeast cream can be a bakers' yeast cream with a dry matter content of over 25% by mass, and that preferably the yeast cream has a dry matter content of between 12 and 25% by mass (normal definition), and still more preferably of between 15 and 22% by mass.

It is also to be noted that said yeast cream can additionally include ingredients, additives or technological auxiliaries having a role of bread improver and/or a role of maintaining the homogeneity of the suspension formed from the mixture thus obtained. Said ingredients, additives or technological auxiliaries for bread improver are, for example, used either alone or in combination, oxidizing agents such as ascorbic acid, reducing agents such as L-cysteine, enzymatic preparations having one or more enzymatic activities, such as preparations of amylases(s), xylanase(s), lipases(s) and/or phospholipase(s) and oxidase(s), for example glucose oxidase.

Various aspects of the present invention are described in greater detail below, with reference to the attached figures which illustrate embodiments, by way of non-limiting examples.

BRIEF DESCRIPTION OF THE DRAWINGS

FIG. 3 shows a perspective view of an embodiment of the device comprising two interchangeable transport reservoirs.

DESCRIPTION OF A PREFERRED EMBODIMENT

Figure 1:
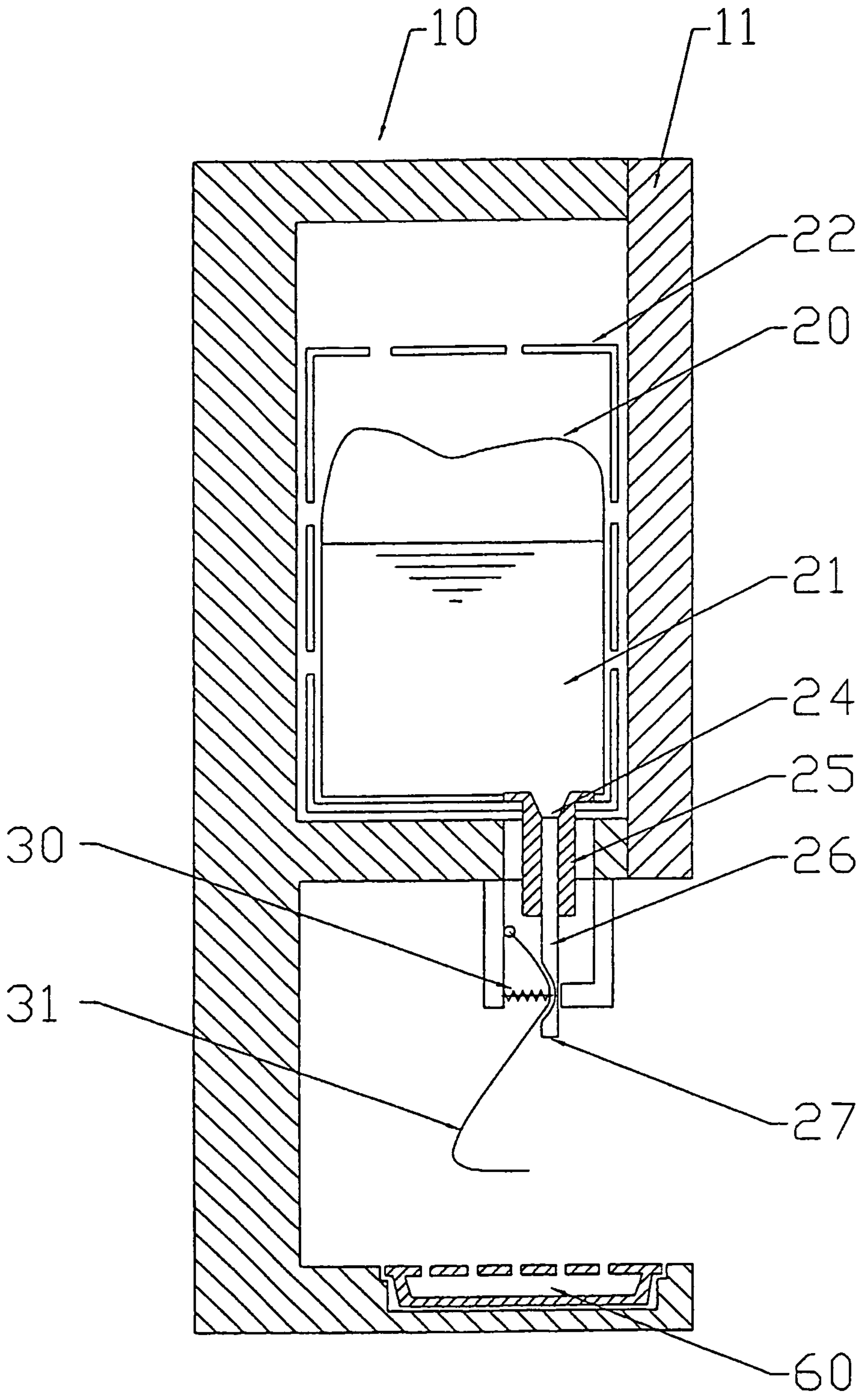
FIG. 1 shows a vertical cross section, from the side, of a first embodiment of the device according to the invention.

The device for dosing stabilized bakers' yeast cream comprises a refrigerated compartment 10 provided with a door 11. The temperature inside the refrigerated chamber 10 is regulated at approximately 3° C.

A collapsible bag 20 containing stabilized yeast cream 21 is located inside the refrigerated compartment 10.

According to the embodiment illustrated in FIG. 1, the collapsible bag 20 is located in a rigid casing 22 of cardboard.

Figure 2:
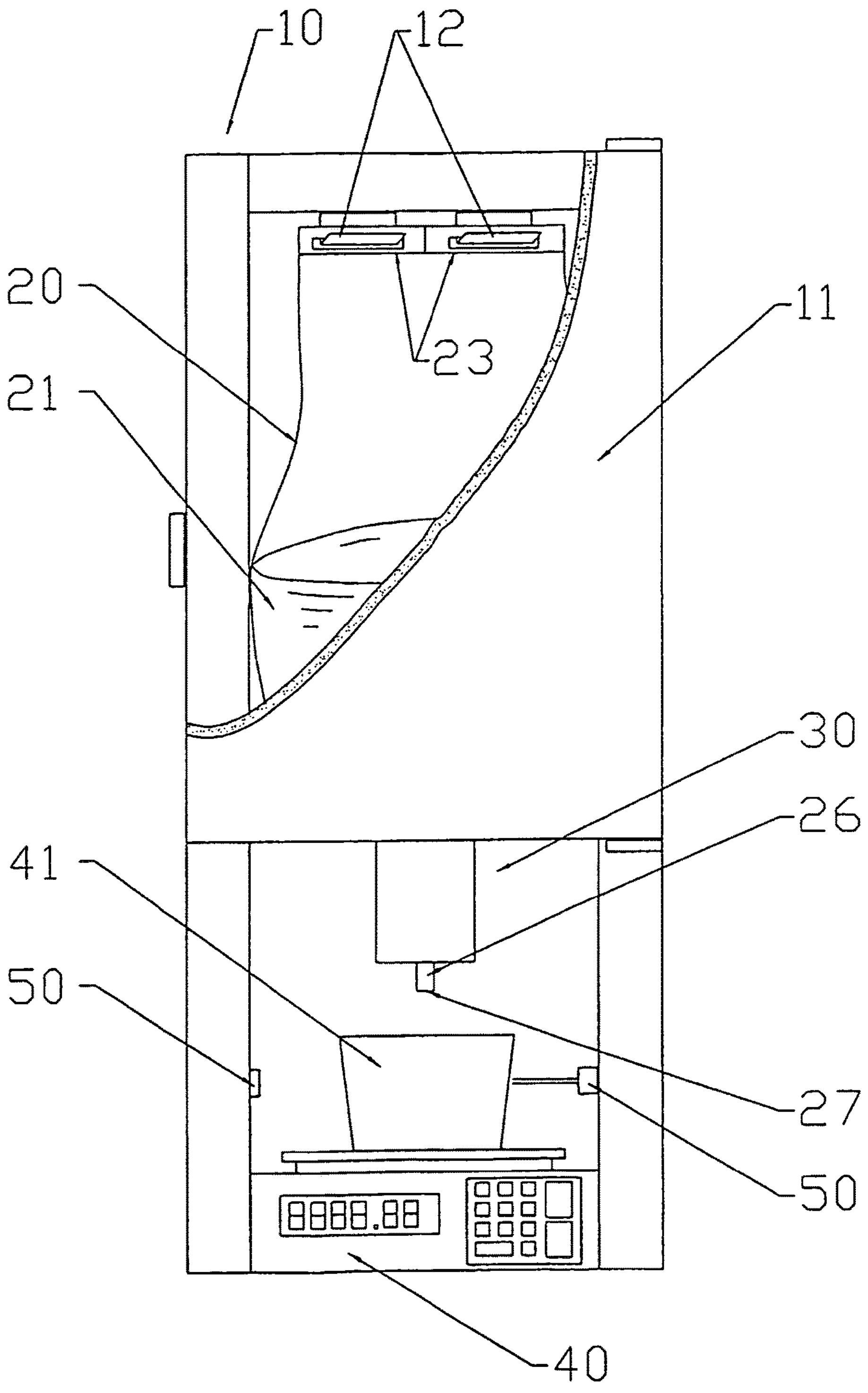
FIG. 2 shows a frontal view, partly cut away, of another embodiment of the device.

According to the embodiment illustrated in FIG. 2, the collapsible bag 20 is suspended in the refrigerated compartment 10. For this purpose, eyelets 23 are provided in the collapsible bag 20, and the refrigerated compartment 10 is equipped with hooks 12 which engage in the eyelets 23 of the bag 20.

The outlet opening 24 of the collapsible bag 20 is located at the bottom of the refrigerated compartment 10. A ring 25 made of rigid plastic material surrounds the outlet opening 24 which leads into a hollow tube 26 made of flexible material. Said hollow tube 26 forms the outlet conduit for dosing yeast cream, and it ends in the dispensing opening 27.

An opening/closing mechanism 30 enables the opening of the outlet conduit for the dispensing of the yeast cream by releasing the flexible hollow tube 26 and also enables, after dispensing of the desired quantity of yeast cream, the closure of the outlet conduit by pinching the flexible hollow tube 26 so as to prevent the yeast cream from flowing from the collapsible bag 20.

As the bag 20 is a collapsible bag, there are no gas bubbles entering into the bag 20 to compensate for the dosed volume of yeast cream. The yeast cream 21 remaining in the bag 20 is thus conserved under optimal hygiene conditions.

According to the opening/closing mechanism 30 of the device illustrated in FIG. 1, the outlet conduit is opened and closed by means of a lever 31. By pushing said lever rearward, for example by means of the receptacle in which the dosed quantity of yeast cream is intended to be collected, the lever 31 frees the outlet conduit in such a way that the yeast cream flows from the dispensing opening 27. By releasing the lever 31, for example by removing receptacle, the lever once again pushes against the flexible hollow tube 26 thereby closing the outlet conduit.

FIG. 2 shows a more sophisticated embodiment. According to this embodiment, the device is provided with a weighing means 40. Using the keypad of said weighing means 40, the baker enters the desired quantity of yeast cream. A control station (not shown) activates the automatic opening of the outlet conduit by the opening/closing mechanism 30. When the weighing means 40 detects that the desired quantity of yeast cream has been introduced into the receptacle 41, the control station activates the automatic closure of the outlet conduit by the opening/closing mechanism 30. To avoid that the opening of the outlet conduit by the opening/closing mechanism 30 be activated in the absence of a receptacle 41 below the dispensing opening 27, the device is provided with an optical system 50 for detecting the presence of a receptacle 41, and the control station activates opening of the outlet conduit only when the detection system 50 detects the presence of a receptacle 41 below the dispensing opening 27.

According to one possible embodiment, the device is provided with a safety means detecting any flow of yeast cream not caught by a receptacle. Such a detection means can be in the form of a collecting basin 60 below the outlet opening 27, said basin 60 being provided with a level detector, and the control station activating the closure of the outlet conduit when a predetermined level of liquid is detected in the collecting basin 60.

FIG. 3 shows a device according to the invention mounted on casters, in which the refrigerated compartment contains two interchangeable transport reservoirs containing stabilized bakers' yeast cream.

According to the embodiment illustrated, the refrigerated compartment is designed in such a way as to be able to accommodate two transport reservoirs according to the invention of the bag-in-box type.

Said transport reservoirs are supplied to the baker in the form of a kit according to the invention comprising, on the one hand, one or more transport reservoirs containing stabilized bakers' yeast cream and, on the other hand, one or more flexible hollow tubes 26. Before placing a transport reservoir in the refrigerated compartment 10, the baker mounts the hollow tube 26 on the transport reservoir in such a way as to form an outlet conduit for the yeast cream contained in the reservoir. When the reservoir is emptied, the hollow tube 26 is detached from the reservoir in order to be fitted onto a new transport reservoir after it has been cleaned.

As is illustrated on the left-hand side of FIG. 3, the front part of the opening/closing mechanism 30 can be dismounted or opened in order to facilitate removal of the emptied transport reservoir and insertion of a new full transport reservoir, after which the front part of the opening/closing mechanism 30 is put back into place or closed.

The rigid casing 22 of cardboard, in which the collapsible bag is located, is provided with a series of openings 28 allowing the baker to check visually the level of the stabilized yeast cream present in the transport reservoir. This visual check is made even easier when the door 11 of the refrigerated chamber is transparent opposite this series of openings 28.

The rigid casing 22 is also provided with a detection means 29*a*, 29*b* enabling to check whether the reservoir, and the baker's yeast cream contained, have been kept at a sufficiently low temperature therein to allow good conservation of the cream, notably during transport and storage of the filled reservoir. When the temperature of the reservoir and of its content exceeds 12° C., the part 29*a* of the detection means gradually changes color, so as to alert the baker or his supplier.

The device is also provided with an indicator 13 showing the temperature inside said refrigerated compartment 10, and with an alarm 14*a* and 14*b* alerting the baker when the temperature inside the refrigerated compartment 10 does not correspond to the temperature range determined for conservation of the yeast cream, for example because of a failure of the cooling system.

In the embodiment illustrated, this alarm comprises two light indicators 14*a* and 14*b*, the green indicator 14*a* being lit when the temperature inside the refrigerated compartment 10 is within this temperature range, and the red indicator 14*b* being lit in the opposite case.

This alarm can be replaced or complemented by an acoustic alarm system.

The manual lever 31 of the opening/closing mechanism 30 makes it possible to open and close the outlet conduit formed by the hollow tube 26.

The front part of the opening/closing mechanism 30 can be temporarily removed or opened to facilitate inserting a new reservoir into the refrigerated compartment 10.

Advantageously, in the figures mentioned above, the bag 20 can itself also be packaged in a flexible outer packaging, for example an outer packaging of the netting or fabric type, made of a resistant material giving the bag mechanical protection, this variant not being shown in the figures.

The invention claimed is:

1. A device for dosing of stable bakers' yeast cream in a bakery, said device comprising:

- a piece of furniture provided with a refrigerated compartment having an internal temperature regulated at between −2° C. and 12° C.;
- an indicator showing the temperature inside said refrigerated compartment;
- an alarm alerting when the temperature inside the refrigerated compartment does not correspond to a determined temperature range;
- an interchangeable transport reservoir located in the refrigerated compartment and containing stable yeast cream, said reservoir having a total internal volume of between 1 and 100 liters, and an outlet opening for the yeast cream;
- an outlet conduit for dosing of the yeast cream, said conduit connecting the outlet opening of the interchangeable transport reservoir to a dispensing opening outside the refrigerated chamber; and
- an opening/closing mechanism for the outlet conduit, enabling the opening of the outlet conduit for the dispensing of the yeast cream and enabling the closure of the outlet conduit in order to stop the dispensing of the yeast cream, said device permitting the dispensing of a dosed quantity of yeast cream from the interchangeable transport reservoir via the dispensing opening, and said device being devoid of any agitator for mixing the content of the transport reservoir wherein said interchangeable transport reservoir is a collapsible bag that permits the dispensing of a dosed quantity of yeast cream via the dispensing opening by activation of the opening/closing mechanism without entry of gas from outside the collapsible bag into the collapsible bag.

2. The device according to claim 1, wherein said collapsible bag is surrounded by one or more outer packagings.

3. The device according to claim 2, wherein said collapsible bag is surrounded by one or more outer packagings selected from protective outer packagings made of a flexible material, a wire basket or a self-supporting casing.

4. The device according to claim 1, wherein said outlet conduit is a tube with open ends.

5. The device according to claim 1, wherein said outlet conduit comprises a flexible part and said opening/closing mechanism enables the closing of said outlet conduit by pinching said flexible part and the opening of the outlet conduit by releasing said flexible part.

6. The device according to claim 1, further comprising a weighing apparatus provided with a support surface for a receptacle, said weighing apparatus enabling the weighing of the quantity of the yeast cream introduced into the receptacle via said dispensing opening during dispensing of the yeast cream.

7. The device according to claim 1, further comprising a control station activating the opening and closure of said outlet conduit by said opening/closing mechanism.

8. The device according to claim 7, wherein said control station activates the closure of said outlet conduit once a desired quantity of the yeast cream is present in a receptacle.

9. The device according to claim 1, wherein said piece of furniture comprises at least two refrigerated compartments which contain an interchangeable transport reservoir containing stable yeast cream and having a total internal-volume of between 1 and 100 liters and an outlet opening for the yeast cream.

10. The device according claim 9, wherein it comprises for each of said interchangeable transport reservoirs:

an outlet conduit for dosing of the yeast cream, said conduit connecting the outlet opening of the interchangeable transport reservoir to a dispensing opening outside the refrigerated chamber; and an opening/closing mechanism for said outlet conduit, enabling the opening of said outlet conduit for the dispensing of the yeast cream and enabling the closure of said outlet conduit so as to stop the dispensing of the yeast cream from said interchangeable transport reservoir.

11. The device according to claim 1, wherein said piece of furniture comprises a refrigerated compartment which contains at least two interchangeable transport reservoirs containing stable yeast cream and having a total internal volume of between 1 and 100 liters and an outlet opening for the yeast cream.

12. The device according claim 11, wherein it comprises for each of said interchangeable transport reservoirs:

an outlet conduit for dosing of the yeast cream, said conduit connecting the outlet opening of the interchangeable transport reservoir to a dispensing opening outside the refrigerated chamber; and an opening/closing mechanism for said outlet conduit, enabling the opening of said outlet conduit for the dispensing of the yeast cream, and enabling the closure of said outlet conduit so as to stop the dispensing of the yeast cream from said interchangeable transport reservoir.

13. The device according to claim 1, wherein the stable yeast cream has a dry matter content of between 12 and 25 % by mass.

14. The device according to claim 1, wherein the stable yeast cream is a stabilized yeast cream.

15. The device according to claim 1, wherein the yeast cream comprises one or more ingredients, additives or technological auxiliaries having a role of bread improver and/or a role of maintaining homogeneity.

16. Installation for dosing stable yeast cream in a bakery, comprising at least two devices according to claim 1.

17. The device according to claim 1, wherein the stable yeast cream has a dry matter content of at least 12% by mass.

18. The device according to claim 1, wherein the collapsible bag is a polyethylene bag having a wall thickness comprised between 10 and 200 μm.

19. The device according to claim 18, wherein the collapsible bag has a wall thickness comprised between 25 and 50 μm.

20. The device according to claim 1, wherein said collapsible bag is provided with a reinforcing layer or pouch.

21. A method of dosing of bakers' yeast cream in a bakery containing a device comprising:

a piece of furniture having a refrigerated compartment having an internal temperature regulated at between −2° C. and 12° C.;

an indicator showing the temperature inside said refrigerated compartment;

an alarm alerting when the temperature inside the refrigerated compartment does not correspond to a determined temperature range;

an interchangeable transport reservoir located in the refrigerated compartment and containing stable yeast cream, said reservoir having a total internal volume of between 1 and 100 liters and an outlet opening for the yeast cream;

an outlet conduit, said conduit connecting the outlet opening of the interchangeable transport reservoir to a dispensing opening outside the refrigerated chamber; and an opening/closing mechanism enabling the opening and closing of the outlet conduit, said device being devoid of any stirrer for mixing the content of the transport reservoir, said interchangeable transport reservoir being a collapsible bag, the method including dispensing a dosed quantity of yeast cream from the interchangeable transport reservoir via the dispensing opening and the outlet conduit by:

opening the outlet conduit by means of the opening/closing mechanism for the dispensing of the yeast cream; and closing the outlet conduit by means of the opening closing mechanism in order to stop the dispensing of the yeast cream, wherein the collapsible bag permits the dispensing of a dosed quantity of yeast cream via the dispensing opening by activation of the opening/closing mechanism without entry of gas from outside the collapsible bag into the collapsible bag.

22. A device for dosing of stable bakers' yeast cream in a bakery, said device comprising:

a piece of furniture provided with a refrigerated compartment having an internal temperature regulated at between −2° C. and 12° C.;

an interchangeable transport reservoir located in the refrigerated compartment and containing stable yeast cream, said reservoir having a total internal volume of between 1 and 100 liters, and an outlet opening for the yeast cream;

an outlet conduit for dosing of the yeast cream, said conduit connecting the outlet opening of the interchangeable transport reservoir to a dispensing opening outside the refrigerated chamber; and an opening/closing mechanism for the outlet conduit, enabling the opening of the outlet conduit for the dispensing of the yeast cream and enabling the closure of the outlet conduit in order to stop the dispensing of the yeast cream, said device permitting the dispensing of a dosed quantity of yeast cream from the interchangeable transport reservoir via the dispensing opening.

23. A device for dosing of stable bakers' yeast cream in a bakery, said device comprising:

a piece of furniture provided with a refrigerated compartment having an internal temperature regulated at between −2° C. and 12° C.;

an interchangeable transport reservoir located in the refrigerated compartment and containing stable yeast cream, said reservoir having a total internal volume of between 1 and 100 liters, and an outlet opening for the yeast cream;

an outlet conduit for dosing of the yeast cream, said conduit connecting the outlet opening of the interchangeable transport reservoir to a dispensing opening outside the refrigerated chamber; and an opening/closing mechanism for the outlet conduit, enabling the opening of the outlet conduit for the dispensing of the yeast cream and enabling the closure of the outlet conduit in order to stop the dispensing of the yeast cream, said device permitting the dispensing of a dosed quantity of yeast cream from the interchangeable transport reservoir via the dispensing opening, wherein said interchangeable transport reservoir is a collapsible bag that permits the dispensing of a dosed quantity of yeast cream via the dispensing opening by activation of the opening/closing mechanism without entry of gas from outside the collapsible bag into the collapsible bag.

24. The device of claim 23, wherein said outlet opening of said collapsible bag is located at the bottom of said refrigerated compartment.

25. The device of claim 24, wherein a ring made of rigid plastic material surrounds said outlet opening.

26. A device for dosing of stable bakers' yeast cream in a bakery, said device comprising:

a piece of furniture provided with a refrigerated compartment having an internal temperature regulated at between −2° C. and 12° C.;

an indicator showing the temperature inside said refrigerated compartment;

an alarm alerting when the temperature inside the refrigerated compartment does not correspond to a determined temperature range;

an interchangeable transport reservoir located in the refrigerated compartment and containing stable yeast cream, said reservoir having a total internal volume of between 1 and 100 liters, and an outlet opening for the yeast cream;

an outlet conduit for dosing of the yeast cream, said conduit connecting the outlet opening of the interchangeable transport reservoir to a dispensing opening outside the refrigerated chamber; and an opening/closing mechanism for the outlet conduit, enabling the opening of the outlet conduit for the dispensing of the yeast cream and enabling the closure of the outlet conduit in order to stop the dispensing of the yeast cream, said device permitting the dispensing of a dosed quantity of yeast cream from the interchangeable transport reservoir via the dispensing opening, wherein said interchangeable transport reservoir is a collapsible bag that permits the dispensing of a dosed quantity of yeast cream via the dispensing opening by activation of the opening/closing mechanism without entry of gas from outside the collapsible bag into the collapsible bag.

27. A method of dosing, in a bakery, stable bakers' yeast cream contained in a device for dosing of stable bakers' yeast cream in a bakery, said device comprising:

a piece of furniture provided with a refrigerated compartment having an internal temperature regulated at between −2° C. and 12° C.;

an indicator showing the temperature inside said refrigerated compartment;

an alarm alerting when the temperature inside the refrigerated compartment does not correspond to a determined temperature range;

an interchangeable transport reservoir located in the refrigerated compartment and containing stable yeast cream, said reservoir having a total internal volume of between 1 and 100 liters, and an outlet opening for the yeast cream;

an outlet conduit for dosing of the yeast cream, said conduit connecting the outlet opening of the interchangeable transport reservoir to a dispensing opening outside the refrigerated chamber; and an opening/closing mechanism for the outlet conduit, enabling the opening of the outlet conduit for the dispensing of the yeast cream and enabling the closure of the outlet conduit in order to stop the dispensing of the yeast cream, said device permitting the dispensing of a dosed quantity of yeast cream from the interchangeable transport reservoir via the dispensing opening, and said device being devoid of any agitator for mixing the content of the transport reservoir, the method including dispensing a dosed quantity of yeast cream from the interchangeable transport reservoir via the dispensing opening and the outlet conduit by:

opening the outlet conduit by means of the opening/closing mechanism for the dispensing of the yeast cream; and closing the outlet conduit by means of the opening closing mechanism in order to stop the dispensing of the yeast cream, wherein said interchangeable transport reservoir is a collapsible bag that permits the dispensing of a dosed quantity of yeast cream via the dispensing opening by activation of the opening/closing mechanism without entry of gas from outside the collapsible bag into the collapsible bag.

28. A method of dosing, in a bakery, stable bakers' yeast cream contained in a device for dosing of stable bakers' yeast cream in a bakery, said device comprising:

a piece of furniture provided with a refrigerated compartment having an internal temperature regulated at between −2° C. and 12° C.;

an interchangeable transport reservoir located in the refrigerated compartment and containing stable yeast cream, said reservoir having a total internal volume of between 1 and 100 liters, and an outlet opening for the yeast cream;

an outlet conduit for dosing of the yeast cream, said conduit connecting the outlet opening of the interchangeable transport reservoir to a dispensing opening outside the refrigerated chamber; and an opening/closing mechanism for the outlet conduit, enabling the opening of the outlet conduit for the dispensing of the yeast cream and enabling the closure of the outlet conduit in order to stop the dispensing of the yeast cream, said device permitting the dispensing of a dosed quantity of yeast cream from the interchangeable transport reservoir via the dispensing opening, the method including dispensing a dosed quantity of yeast cream from the interchangeable transport reservoir via the dispensing opening and the outlet conduit by:

opening the outlet conduit by means of the opening/closing mechanism for the dispensing of the yeast cream; and closing the outlet conduit by means of the opening closing mechanism in order to stop the dispensing of the yeast cream.

29. A method of dosing, in a bakery, stable bakers' yeast cream contained in a device for dosing of stable bakers' yeast cream in a bakery, said device comprising:

a piece of furniture provided with a refrigerated compartment having an internal temperature regulated at between −2° C. and 12° C.;

an interchangeable transport reservoir located in the refrigerated compartment and containing stable yeast cream, said reservoir having a total internal volume of between 1 and 100 liters, and an outlet opening for the yeast cream;

an outlet conduit for dosing of the yeast cream, said conduit connecting the outlet opening of the interchangeable transport reservoir to a dispensing opening outside the refrigerated chamber; and an opening/closing mechanism for the outlet conduit, enabling the opening of the outlet conduit for the dispensing of the yeast cream and enabling the closure of the outlet conduit in order to stop the dispensing of the yeast cream, said device permitting the dispensing of a dosed quantity of yeast cream from the interchangeable transport reservoir via the dispensing opening, the method including dispensing a dosed quantity of yeast cream from the interchangeable transport reservoir via the dispensing opening and the outlet conduit by:

opening the outlet conduit by means of the opening/closing mechanism for the dispensing of the yeast cream; and closing the outlet conduit by means of the opening closing mechanism in order to stop the dispensing of the yeast cream, wherein said interchangeable transport reservoir is a collapsible bag that permits the dispensing of a dosed quantity of yeast cream via the dispensing opening by activation of the opening/closing mechanism without entry of gas from outside the collapsible bag into the collapsible bag.

30. A method of dosing, in a bakery, stable bakers' yeast cream contained in a device for dosing of stable bakers' yeast cream in a bakery, said device comprising:

a piece of furniture provided with a refrigerated compartment having an internal temperature regulated at between −2° C. and 12° C.;

an indicator showing the temperature inside said refrigerated compartment;

an alarm alerting when the temperature inside the refrigerated compartment does not correspond to a determined temperature range;

an interchangeable transport reservoir located in the refrigerated compartment and containing stable yeast cream, said reservoir having a total internal volume of between 1 and 100 liters, and an outlet opening for the yeast cream;

an outlet conduit for dosing of the yeast cream, said conduit connecting the outlet opening of the interchangeable transport reservoir to a dispensing opening outside the refrigerated chamber; and an opening/closing mechanism for the outlet conduit, enabling the opening of the outlet conduit for the dispensing of the yeast cream and enabling the closure of the outlet conduit in order to stop the dispensing of the yeast cream, said device permitting the dispensing of a dosed quantity of yeast cream from the interchangeable transport reservoir via the dispensing opening, the method including dispensing a dosed quantity of yeast cream from the interchangeable transport reservoir via the dispensing opening and the outlet conduit by:

opening the outlet conduit by means of the opening/closing mechanism for the dispensing of the yeast cream; and closing the outlet conduit by means of the opening closing mechanism in order to stop the dispensing of the yeast cream, wherein said interchangeable transport reservoir is a collapsible bag that permits the dispensing of a dosed quantity of yeast cream via the dispensing opening by activation of the opening/closing mechanism without entry of gas from outside the collapsible bag into the collapsible bag.

31. A method of dosing liquid contained in a device for dosing of liquid, said device comprising:

a piece of furniture provided with a refrigerated compartment having an internal temperature regulated at between −2° C. and 12° C.;

an indicator showing the temperature inside said refrigerated compartment;

an alarm alerting when the temperature inside the refrigerated compartment does not correspond to a determined temperature range;

an interchangeable transport reservoir located in the refrigerated compartment and containing liquid, said reservoir having a total internal volume of between 1 and 100 liters, and an outlet opening for the liquid;

an outlet conduit for dosing of the liquid, said conduit connecting the outlet opening of the interchangeable transport reservoir to a dispensing opening outside the refrigerated chamber; and an opening/closing mechanism for the outlet conduit, enabling the opening of the outlet conduit for the dispensing of the liquid and enabling the closure of the outlet conduit in order to stop the dispensing of the liquid, said device permitting the dispensing of a dosed quantity of liquid from the interchangeable transport reservoir via the dispensing opening, and said device being devoid of any agitator for mixing the content of the transport reservoir, the method including dispensing a dosed quantity of yeast cream from the interchangeable transport reservoir via the dispensing opening and the outlet conduit by:

opening the outlet conduit by means of the opening/closing mechanism for the dispensing of the yeast cream; and closing the outlet conduit by means of the opening closing mechanism in order to stop the dispensing of the yeast cream, wherein said interchangeable transport reservoir is a collapsible bag that permits the dispensing of a dosed quantity of liquid via the dispensing opening by activation of the opening/closing mechanism without entry of gas from outside the collapsible bag into the collapsible bag, wherein said liquid is stable bakers' yeast cream, and wherein said dosing method is performed in a bakery.

32. A method of dosing liquid contained in a device for dosing of liquid, said device comprising:

a piece of furniture provided with a refrigerated compartment having an internal temperature regulated at between −2° C. and 12° C.;

an interchangeable transport reservoir located in the refrigerated compartment and containing liquid, said reservoir having a total internal volume of between 1 and 100 liters, and an outlet opening for the liquid;

an outlet conduit for dosing of the liquid, said conduit connecting the outlet opening of the interchangeable transport reservoir to a dispensing opening outside the refrigerated chamber; and an opening/closing mechanism for the outlet conduit, enabling the opening of the outlet conduit for the dispensing of the liquid and enabling the closure of the outlet conduit in order to stop the dispensing of the liquid, said device permitting the dispensing of a dosed quantity of liquid from the interchangeable transport reservoir via the dispensing opening, the method including dispensing a dosed quantity of yeast cream from the interchangeable transport reservoir via the dispensing opening and the outlet conduit by:

opening the outlet conduit by means of the opening/closing mechanism for the dispensing of the yeast cream; and closing the outlet conduit by means of the opening closing mechanism in order to stop the dispensing of the yeast cream, wherein said liquid is stable bakers' yeast cream, and wherein said dosing method is performed in a bakery.

33. A method of dosing liquid contained in a device for dosing of liquid in a bakery, said device comprising:

a piece of furniture provided with a refrigerated compartment having an internal temperature regulated at between −2° C. and 12° C.;

an interchangeable transport reservoir located in the refrigerated compartment and containing liquid, said reservoir having a total internal volume of between 1 and 100 liters, and an outlet opening for the liquid;

an outlet conduit for dosing of the liquid, said conduit connecting the outlet opening of the interchangeable transport reservoir to a dispensing opening outside the refrigerated chamber; and an opening/closing mechanism for the outlet conduit, enabling the opening of the outlet conduit for the dispensing of the liquid and enabling the closure of the outlet conduit in order to stop the dispensing of the liquid, said device permitting the dispensing of a dosed quantity of liquid from the interchangeable transport reservoir via the dispensing opening, the method including dispensing a dosed quantity of yeast cream from the interchangeable transport reservoir via the dispensing opening and the outlet conduit by:

opening the outlet conduit by means of the opening/closing mechanism for the dispensing of the yeast cream; and closing the outlet conduit by means of the opening closing mechanism in order to stop the dispensing of the yeast cream, wherein said interchangeable transport reservoir is a collapsible bag that permits the dispensing of a dosed quantity of liquid via the dispensing opening by activation of the opening/closing mechanism without entry of gas from outside the collapsible bag into the collapsible bag, wherein said liquid is stable bakers' yeast cream, and wherein said dosing method is performed in a bakery.

34. A method of dosing liquid contained in a device for dosing of liquid, said device comprising:

a piece of furniture provided with a refrigerated compartment having an internal temperature regulated at between −2° C. and 12° C.;

an indicator showing the temperature inside said refrigerated compartment;

an alarm alerting when the temperature inside the refrigerated compartment does not correspond to a determined temperature range;

an interchangeable transport reservoir located in the refrigerated compartment and containing liquid, said reservoir having a total internal volume of between 1 and 100 liters, and an outlet opening for the liquid;

an outlet conduit for dosing of the liquid, said conduit connecting the outlet opening of the interchangeable transport reservoir to a dispensing opening outside the refrigerated chamber; and an opening/closing mechanism for the outlet conduit, enabling the opening of the outlet conduit for the dispensing of the liquid and enabling the closure of the outlet conduit in order to stop the dispensing of the liquid, said device permitting the dispensing of a dosed quantity of liquid from the interchangeable transport reservoir via the dispensing opening, the method including dispensing a dosed quantity of yeast cream from the interchangeable transport reservoir via the dispensing opening and the outlet conduit by:

opening the outlet conduit by means of the opening/closing mechanism for the dispensing of the yeast cream; and closing the outlet conduit by means of the opening closing mechanism in order to stop the dispensing of the yeast cream, wherein said interchangeable transport reservoir is a collapsible bag that permits the dispensing of a dosed quantity of liquid via the dispensing opening by activation of the opening/closing mechanism without entry of gas from outside the collapsible bag into the collapsible bag, wherein said liquid is stable bakers' yeast cream, and wherein said dosing method is performed in a bakery.

35. A method of employing a device for dosing of liquid contained in said device, said device comprising:

a piece of furniture provided with a refrigerated compartment having an internal temperature regulated at between −2° C. and 12° C.;

an indicator showing the temperature inside said refrigerated compartment;

an alarm alerting when the temperature inside the refrigerated compartment does not correspond to a determined temperature range;

an interchangeable transport reservoir located in the refrigerated compartment and containing liquid, said reservoir having a total internal volume of between 1 and 100 liters, and an outlet opening for the liquid;

an outlet conduit for dosing of the liquid, said conduit connecting the outlet opening of the interchangeable transport reservoir to a dispensing opening outside the refrigerated chamber; and an opening/closing mechanism for the outlet conduit, enabling the opening of the outlet conduit for the dispensing of the liquid and enabling the closure of the outlet conduit in order to stop the dispensing of the liquid, said device permitting the dispensing of a dosed quantity of liquid from the interchangeable transport reservoir via the dispensing opening, and said device being devoid of any agitator for mixing the content of the transport reservoir, the method including dispensing a dosed quantity of yeast cream from the interchangeable transport reservoir via the dispensing opening and the outlet conduit by:

opening the outlet conduit by means of the opening/closing mechanism for the dispensing of the yeast cream; and closing the outlet conduit by means of the opening closing mechanism in order to stop the dispensing of the yeast cream, wherein said interchangeable transport reservoir is a collapsible bag that permits the dispensing of a dosed quantity of liquid via the dispensing opening by activation of the opening/closing mechanism without entry of gas from outside the collapsible bag into the collapsible bag, wherein said liquid is stable bakers' yeast cream, and wherein said dosing method is performed in a bakery.

36. A method of employing a device for dosing of liquid contained in said device, said device comprising:

a piece of furniture provided with a refrigerated compartment having an internal temperature regulated at between −2° C. and 12° C.;

an interchangeable transport reservoir located in the refrigerated compartment and containing liquid, said reservoir having a total internal volume of between 1 and 100 liters, and an outlet opening for the liquid;

an outlet conduit for dosing of the liquid, said conduit connecting the outlet opening of the interchangeable transport reservoir to a dispensing opening outside the refrigerated chamber; and an opening/closing mechanism for the outlet conduit, enabling the opening of the outlet conduit for the dispensing of the liquid and enabling the closure of the outlet conduit in order to stop the dispensing of the liquid, said device permitting the dispensing of a dosed quantity of liquid from the interchangeable transport reservoir via the dispensing opening, the method including dispensing a dosed quantity of yeast cream from the interchangeable transport reservoir via the dispensing opening and the outlet conduit by:

opening the outlet conduit by means of the opening/closing mechanism for the dispensing of the yeast cream; and closing the outlet conduit by means of the opening closing mechanism in order to stop the dispensing of the yeast cream, wherein said liquid is stable bakers' yeast cream, and wherein said dosing method is performed in a bakery.

37. A method of employing a device for dosing of liquid contained in said device, said device comprising:

a piece of furniture provided with a refrigerated compartment having an internal temperature regulated at between −2° C. and 12° C.;

an interchangeable transport reservoir located in the refrigerated compartment and containing liquid, said reservoir having a total internal volume of between 1 and 100 liters, and an outlet opening for the liquid;

an outlet conduit for dosing of the liquid, said conduit connecting the outlet opening of the interchangeable transport reservoir to a dispensing opening outside the refrigerated chamber; and an opening/closing mechanism for the outlet conduit, enabling the opening of the outlet conduit for the dispensing of the liquid and enabling the closure of the outlet conduit in order to stop the dispensing of the liquid, said device permitting the dispensing of a dosed quantity of liquid from the interchangeable transport reservoir via the dispensing opening, the method including dispensing a dosed quantity of yeast cream from the interchangeable transport reservoir via the dispensing opening and the outlet conduit by:

opening the outlet conduit by means of the opening/closing mechanism for the dispensing of the yeast cream; and closing the outlet conduit by means of the opening closing mechanism in order to stop the dispensing of the yeast cream, wherein said interchangeable transport reservoir is a collapsible bag that permits the dispensing of a dosed quantity of liquid via the dispensing opening by activation of the opening/closing mechanism without entry of gas from outside the collapsible bag into the collapsible bag, wherein said liquid is stable bakers' yeast cream, and wherein said dosing method is performed in a bakery.

38. A method of employing a device for dosing of liquid contained in said device, said device comprising:

a piece of furniture provided with a refrigerated compartment having an internal temperature regulated at between −2° C. and 12° C.;

an indicator showing the temperature inside said refrigerated compartment;

an alarm alerting when the temperature inside the refrigerated compartment does not correspond to a determined temperature range;

an interchangeable transport reservoir located in the refrigerated compartment and containing liquid, said reservoir having a total internal volume of between 1 and 100 liters, and an outlet opening for the liquid;

an outlet conduit for dosing of the liquid, said conduit connecting the outlet opening of the interchangeable transport reservoir to a dispensing opening outside the refrigerated chamber; and an opening/closing mechanism for the outlet conduit, enabling the opening of the outlet conduit for the dispensing of the liquid and enabling the closure of the outlet conduit in order to stop the dispensing of the liquid, said device permitting the dispensing of a dosed quantity of liquid from the interchangeable transport reservoir via the dispensing opening, the method including dispensing a dosed quantity of yeast cream from the interchangeable transport reservoir via the dispensing opening and the outlet conduit by:

opening the outlet conduit by means of the opening/closing mechanism for the dispensing of the yeast cream; and closing the outlet conduit by means of the opening closing mechanism in order to stop the dispensing of the yeast cream, wherein said interchangeable transport reservoir is a collapsible bag that permits the dispensing of a dosed quantity of liquid via the dispensing opening by activation of the opening/closing mechanism without entry of gas from outside the collapsible bag into the collapsible bag, wherein said liquid is stable bakers' yeast cream, and wherein said dosing method is performed in a bakery.

* * * * *